Figure 2:
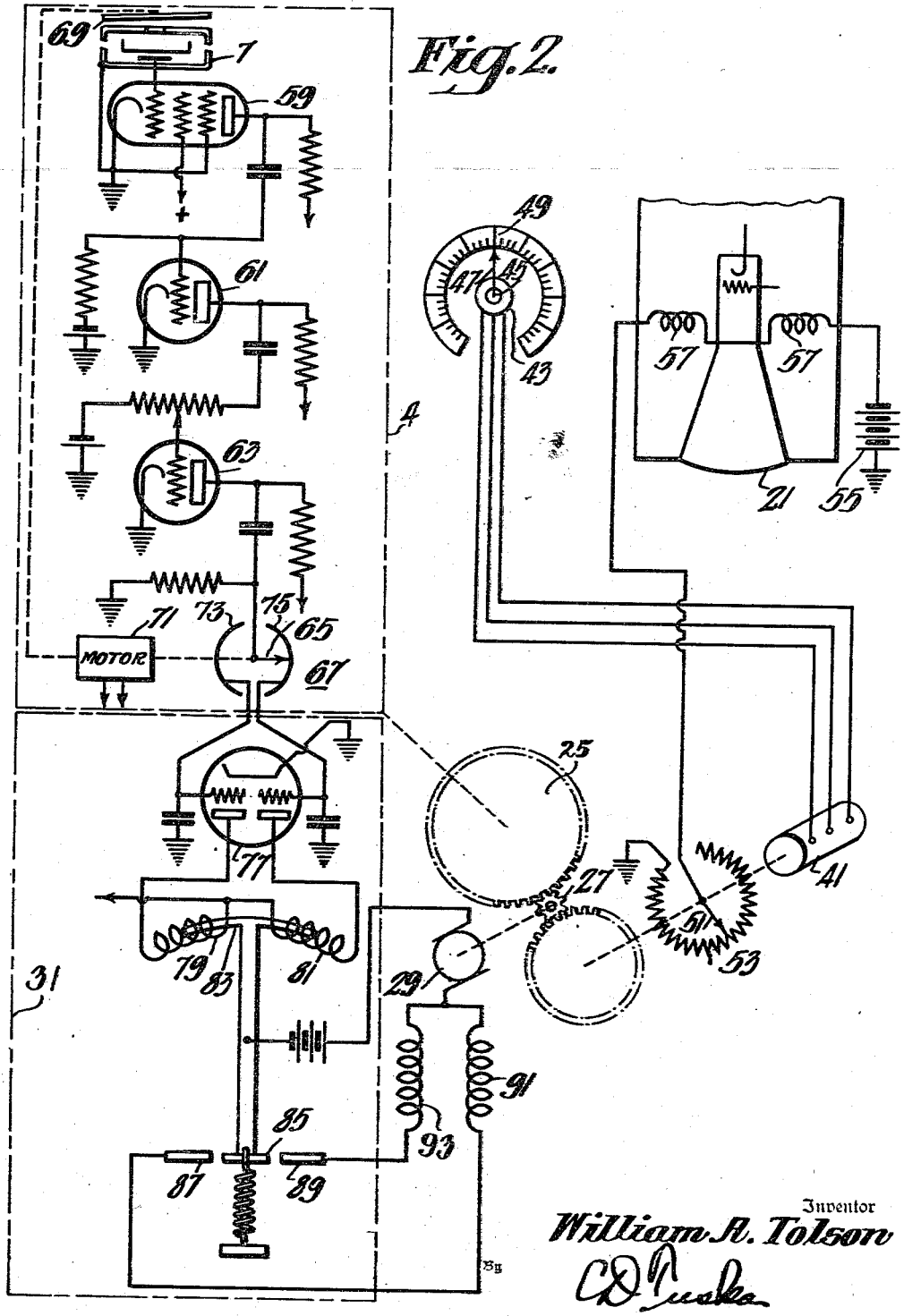

Nov. 25, 1947. W. A. TOLSON 2,431,625
HEAT DETECTING SYSTEM
Filed Feb. 26, 1943 2 Sheets-Sheet 1
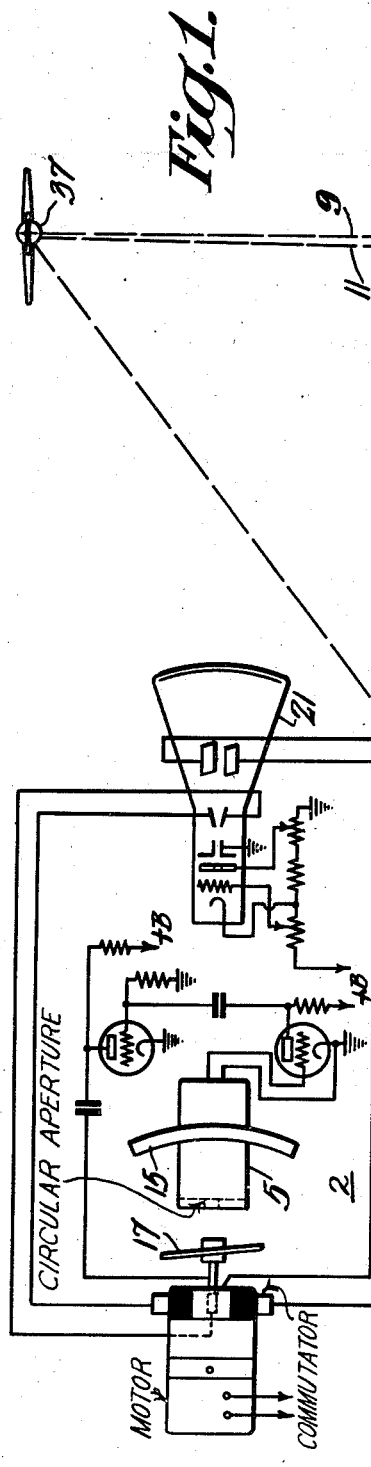
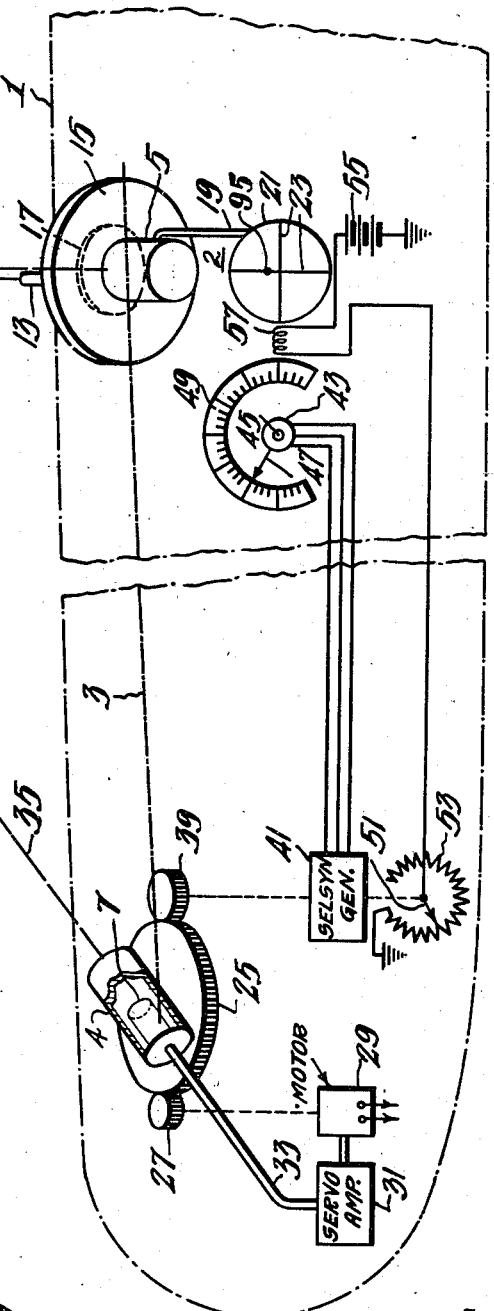
Inventor
William A. Tolson
By
Attorney Patented Nov. 25, 1947

2,431,625

UNITED STATES PATENT OFFICE 2,431,625

HEAT DETECTING SYSTEM

William A. Tolson, Princeton, N. J., assignor to Radio Corporation of America, a corporation of Delaware Application February 26, 1943, Serial No. 477,295

7 Claims. (Cl. 250—1)

This invention relates to heat detecting devices and especially to a heat detecting system in which a heat radiating body may be located with respect to a predetermined reference line and with respect to its range. In a copending application Serial No. 470,520, filed December 29, 1942, for Heat responsive indicators, by R. D. Kell and W. A. Tolson, a heat detecting device has been described. This device locates a heat radiating body with respect to a pair of reference planes which are normal to each other and which intersect along the effective axis of the device. The indications are obtained on a cathode ray tube in which cross lines represent the reference planes and a fluorescent spot represents the image of the heat radiating body.

The instant invention is an improvement over the invention disclosed and claimed in the copending application of Kell and Tolson in that the instant system provides means for not only indicating the range or distance of the heat radiating body but it also includes a further improvement which is especially useful for night combat aircraft. In aerial combat an attack is often made from behind the target airplane because this position provides a target which is practically stationary with respect to the attacking craft. The maximum range at which firing may commence is that at which it becomes practical to compensate for the curved trajectory of the bullets. Normally the attacking pilot provides compensation by adjusting the elevation of the firing, which is controlled by the altitude of the craft in the case of a fixed gun or cannon. In the present system, means are provided whereby automatic compensation is provided to allow for the curved trajectory of the bullet so that the pilot is free to operate the pursuing craft and to fire without making allowance for the range or angle of elevation of the gun.

One of the objects of the invention is to provide an improved means for locating a body radiating heat waves and for indicating the distance of the body with respect to the heat detector. Another object is to provie a heat detector with means whereby its effective axis is automatically oriented to point at the source of heat which is being detected. An additional object is to provide an improved heat detecting system for night attacking aircraft. A still further object is to provide means for indicating automatically the location of the heat radiating body, its range, and to compensate for the trajectory of bullets to be fired at the heat radiating target.

The invention will be described by reference to the accompanying drawings in which Figure 1 is a schematic view, partly in perspective, of one embodiment of the invention applied to aircraft for locating the range and position of a heat radiating body, Figure 2 is a schematic diagram of the component parts and the elements used in the self-orienting heat indicator shown in the left of the system of Fig. 1 together with the range indicator and cathode ray tube, and Figure 3 is a diagrammatic illustration of other component parts which are employed in the heat detector and cathode ray tube position indicator of Fig. 1 as shown in the righthand portion of Fig. 1. Similar elements in the drawings will be indicated by similar reference characters.

Referring to Fig. 1, a section of an aircraft wing 1 forms the base and hence the base line 3 along which a fixed indicator 2 and a self-orienting indicator 4, including, respectively, heat detecting devices 5, 7, are located. One suitable form of the heat sensitive devices 5 and 7 is illustrated in Fig. 3 of Wolff Patent 2,234,328, which issued on March 11, 1941, for an improvement in a Radiant energy receiving device. In the instant arrangement the fixed indicator 2, including the heat detecting device 5, is located so that its axis 9 is substantially the fore and aft axis of the aircraft. Moreover, the axis 9 is substantially in line with the axis 11 of the aircraft gun or cannon 13. As described in the copending application of Kell and Tolson, referred to above, the first heat sensitive device 5 is provided with a reflecting mirror 15 and a heat deflector 17 which is rotated by a motor, not shown in Fig. 1 but illustrated in Fig. 3. The heat sensitive device 5 is connected by a cable 19 to the cathode ray tube 21 through an amplifier and a four-position commutator as shown in Fig. 3. The tube 21 may be provided with crossed lines 23 which correspond to intersecting planes of reference by which the heat radiating target is located.

The self-orienting indicator 4 including heat sensitive device 7 (shown diagrammatically in Fig. 2), is preferably located well toward the wing tip of the aircraft. To minimize aerodynamic resistance the indicator may be enclosed within the wing provided the wing is equipped with a window which does not substantially attenuate the heat rays. The indicator is mounted on a gear 25 which meshes with a driving pinion 27. The driving pinion is mounted on the shaft of a motor 29 which is controlled by a servo amplifier 31. The servo amplifier has its input connected to the heat detecting device by means of a cable 33. The servo mechanism controls the motor in response to the received heat waves so that its effective axis 35 is pointed automatically at the heat radiating target which may be an internal combustion engine on the target aircraft 37.

The gear 25 which rotates the self-orienting indicator 4 also engages a driven gear 39 which is connected to a Selsyn generator 41. The Selsyn generator is electrically connected to, and drives, a second Selsyn device 43. The shaft 45 of the second Selsyn device moves a pointer 47 which indicates the range of the target 37 on a suitable scale 49. The range is indicated as a function of the triangle formed by the base line 3, the reference line 9 and the effective axis line 35.

It should be understood that the Selsyn motor system 41, 43 may be replaced by a flexible shaft or like means which will indicate the angle between the effective axis line 35 and the base line 3. In any event the driven gear 39 may be connected to the movable arm 51 of a variable resistor 53. The variable resistor is connected to suitable potential or current means 55 and hence to cathode ray deflecting coils 57 which are shown in Fig. 2.

The servo control amplifier circuit, shown in Fig. 2, is similar to the Kell and Tolson device, modified to make it self-orienting and is connected as follows: The heat sensitive device 7 is connected to the input cirucit of an amplifier which includes one or more thermionic tubes 59, 61, 63. The output circuit of the amplifier includes the rotating arm 65 of a commuator 67. The commutator arm 65 is driven in synchronism with the heat deflecting plate 69 by means of a motor 71. The fixed segments 73, 75 are connected, respectively, to the input circuits of a pair of amplifiers 77 which may be housed within a single envelope. The output circuit of the amplifiers includes differentially connected coils 79, 81. A suitable armature 83 is positioned within the coils. The armature controls a movable contact 85. The movable contact 85 engages one or the other of the fixed contacts 87, 89 which are in turn connected to the field windings 91, 93 of the servo motor 29. The balance of the circuit has been previously described in connection with Fig. 1.

The fixed indicator 2 is shown diagrammatically in Fig. 3. Before describing the mode of operation of the system as a whole, reference is made to the operation of the heat detector of Fig. 3, which is specifically claimed in the above entitled Kell and Tolson application. The heat waves from a distant object are applied from the mirror 15 to the rotating reflecting element 17 and from the reflecting element 17 to the heat sensitive device 5 which includes a circular aperture so that the applied heat image forms a spot which is rotated either (a) concentrically along the circumference of the circular aperture or (b) eccentrically along the circumference of the circular aperture. The concentricity of the rotating path depends upon the alignment of the axis 9 of the mirror 15 with respect to the source of the heat. If the image is applied concentrically, equal voltages or currents, which may be amplified, are derived at each of the four positions of the commutator. The voltages are applied from the commutator, which is operated in synchronism with the reflector 17, to the deflecting electrodes of the cathode ray tube 21. Since the voltages are all equal, the cathode ray beam of the tube 21 is not deflected and therefore, the beam forms a spot at the center of the fluorescent screen. If the image is applied eccentrically, the heat sensitive device will not respond equally at each of the four commutator positions. Therefore, the deflecting voltages will be unequal and the cathode ray will be deflected with respect to the reference lines 23. The resulting spot 95 will indicate whether the axial line of the heat responsive system 7 is pointing to the right or to the left, and up or down with respect to the source.

Thus the fixed indicator 2 indicates the relative direction of the source of heat radiations. The plane itself may then be oriented so that the object 37 lies on the axis 9 while observing the position of the spot 95. When so oriented and when the self-orienting heat indicator 4, which is spaced along the base line 3, is also oriented so that it points at the source 37, the distance of the source 37 measured from the plane I along line 9 may be determined as a function of the angle between the lines 3 and 35. The angle of the self-orienting indicator may be made automatic as described.

Now considering the system as a whole, the mode of operation is essentially as follows: Heat waves from the target 37 are directed by the mirror 15 and the rotating reflecting element 17 whereby the cathode ray is directed at the intersection of the lines 23 if the target lies on the effective axis 9 of the heat detecting device. If the target is to the right of the axis 9 the cathode ray will form a spot to the right of the intersecting lines 23 to indicate the location of the target. Moreover, if the target is below the reference line 9 the spot will appear below the intersection of the lines 23. In a similar manner, the reference spot may appear above the intersection. This particular mode of operation is described more fully in the above mentioned copending application.

The self-orienting indicator is also responsive to heat waves from the target. If these heat waves fall on the center of the heat sensitive device which will be the case when the target is on the effective axis line 35, equal currents will be applied through the amplifier 31 to the commutator 67, 73, 75. If equal currents are applied through the commutator, the differential relay will remain at its mid position so that the controlling motor 29 will be at rest. If, however, the target is to the left of the axis line 35 the currents applied to the two sections of the commutator will be unequal whereby unequal currents will be applied to the differential relay whose contacts will connect one of the field windings 91, 93 to drive the motor, clockwise or counterclockwise as the case may be, until the effective axis line 35 falls on the target 37.

The movements of the self-orienting indicator are repeated by the pointer 47 so that the range of the target may be indicated as a function of the angle between the base line 3 and the effective axis line 35 or in terms of the intersection of the reference line 9 and the effective axis line 35.

If the device is to be used to control fire from the gun 13 the cathode ray may be biased upwardly to compensate automatically for the trajectory of the bullets. In this case it will be unnecessary for the pilot to consider the range inasmuch as it will be only necessary to change the elevation and direction of the plane until the target image 95 falls on the intersection of the lines 23. Rheostat 53 may be driven to produce a "gun elevation order" correction on the kinescope which is correct at any range for the particular gun used, or the relation between angular rotation and the resistance may be adjusted to fit any predetermined trajectory.

Thus the invention has been described as an improved heat detecting system employing a pair of heat indicators. The first indicates the location of a heat radiating target with respect to a pair of intersecting reference planes. The second is self-orienting so that its effective axis is made to point at the target. The range of the target is then indicated as a function of the angle formed by the base line connecting the two and the effective axis of the second heat indicator. It should be understood that the accuracy of the range indication is increased as the base line is increased.

I claim as my invention:

1. A heat detecting system including a pair of directionally responsive heat indicators spaced along a base line, means connected to one of said indicators for indicating the position of a heat radiating body with respect to a predetermined line passing through said base line and said body, means connected to said other indicator and including a servo motor for causing said other indicator to point the effective axis of directional response of said other indicator at said body, and means for indicating the range of said body as a function of the angle between said axis and said base line.

2. A heat detecting system including a pair of directionally responsive heat detecting indicators spaced along a base line, means connected to one of said indicators for indicating the position of a heat radiating body with respect to a predetermined line passing through said base line and said body, means connected to the other indicator and including a servo motor for causing said other indicator to point its axis of directional response at said body, and means responsive to movements of the other of said indicators for indicating the range of said body from said base line as a function of the angle between said base line and a line from said other indicator to said body.

3. A heat detecting system including a pair of directionally responsive heat detecting indicators spaced along a base line, one of said indicators including means for indicating the position of a heat radiating body with respect to predetermined reference planes passing through said one of said indicators and said body, and the other of said indicators including means for indicating the range of said body from said base line as a function of the angle between said base line and a line from said other indicator to said body.

4. A heat detecting system including a pair of directionally responsive heat detecting indicators spaced along a base line, one of said indicators including cathode ray means for indicating the position of a heat radiating body with respect to predetermined reference planes, and the other of said indicators including means for indicating the range of said body from said base line as a function of the angles between said base line and lines from predetermined points on said base line passing through said radiating body.

5. A heat detecting system including a pair of directionally responsive heat detecting indicators spaced along a base line, means connected to one of said indicators for indicating the position of a heat radiating body with respect to a predetermined reference line passing through said base line and said indicator, means for directing said other indicator in response to the heat waves from said body to point the effective axis of said other indicator at said body, and means for indicating the distance of the heat radiating body as a function of the triangle formed by said base line, said predetermined reference line, and said effective axis.

6. A heat detecting system for directing gun fire at a body radiating heat waves including a pair of directionally responsive heat detecting indicators spaced along a base line, the directional response of at least one of said indicators providing an effective directional axis, means responsive to said heat waves applied to one of said indicators for forming an optical trace whose location with respect to predetermined reference lines indicates the position of the source of said heat waves with respect to predetermined reference planes passing through said base line, means for directing the other said indicators in response to said heat waves so that the effective directional axis of said other indicator is directed at said source, and means for producing a voltage which varies as a function of the angle between said base line and said effective axis for biasing said optical forming means to compensate for the trajectory of the bullets to be fired at said body.

7. A system of the character of claim 6 including means for indicating the range of said body as a function of the angle between said base line and said effective axis.

WILLIAM A. TOLSON.

REFERENCES CITED

The following references are of record in the file of this patent:

UNITED STATES PATENTS

| Number | Name | Date |
|---|---|---|
| 2,056,216 | Somers et al. | Oct. 6, 1936 |
| 2,115,578 | Hall | Apr. 26, 1938 |
| 1,387,850 | Hammond | Aug. 16, 1921 |

Certificate of Correction

Patent No. 2,431,625.

November 25, 1947.

WILLIAM A. TOLSON

It is hereby certified that error appears in the printed specification of the above numbered patent requiring correction as follows: Column 6, line 41, claim 6, after the word "optical" insert *trace*; and that the said Letters Patent should be read with this correction therein that the same may conform to the record of the case in the Patent Office.

Signed and sealed this 5th day of October, A. D. 1948.

[SEAL]

THOMAS F. MURPHY,
*Assistant Commissioner of Patents.*